United States Patent
Inafuku

(10) Patent No.: US 10,703,953 B2
(45) Date of Patent: Jul. 7, 2020

(54) THERMALLY CONDUCTIVE SILICONE COMPOSITION

(71) Applicant: Shin-Etsu Chemical Co., Ltd., Tokyo (JP)

(72) Inventor: Kenichi Inafuku, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 37 days.

(21) Appl. No.: 16/037,231

(22) Filed: Jul. 17, 2018

(65) Prior Publication Data

US 2019/0023961 A1    Jan. 24, 2019

(30) Foreign Application Priority Data

Jul. 18, 2017 (JP) ................. 2017-139058

(51) Int. Cl.

| | | |
|---|---|---|
| *C08K 3/22* | (2006.01) | |
| *C09K 5/14* | (2006.01) | |
| *C08G 77/12* | (2006.01) | |
| *C09D 183/04* | (2006.01) | |
| *C08G 77/04* | (2006.01) | |
| *C08K 3/28* | (2006.01) | |
| *C08K 3/14* | (2006.01) | |
| *C08K 3/38* | (2006.01) | |
| *C08G 77/20* | (2006.01) | |
| *C08K 3/36* | (2006.01) | |

(52) U.S. Cl.
CPC ............ *C09K 5/14* (2013.01); *C08G 77/12* (2013.01); *C09D 183/04* (2013.01); *C08G 77/045* (2013.01); *C08G 77/20* (2013.01); C08K 3/14 (2013.01); C08K 3/22 (2013.01); C08K 3/36 (2013.01); C08K 2003/2227 (2013.01); C08K 2003/2296 (2013.01); C08K 2003/282 (2013.01); C08K 2003/382 (2013.01); C08K 2201/001 (2013.01)

(58) Field of Classification Search
CPC ...... C08K 2201/001; C08K 2003/2227; C08K 2003/2296; C08K 3/22; C08K 3/14; C08K 3/36; C08K 3/382
See application file for complete search history.

(56) References Cited

U.S. PATENT DOCUMENTS

| 5,167,851 | A  | * | 12/1992 | Jamison | ............... | C10M 169/00 |
|---|---|---|---|---|---|---|
| | | | | | | 252/74 |
| 6,464,995 | B1 | * | 10/2002 | Sekutowski | ............. | A01G 7/00 |
| | | | | | | 424/405 |
| 7,070,670 | B2 | * | 7/2006 | Tomiyama | ............. | C09J 163/00 |
| | | | | | | 156/248 |
| 8,329,831 | B2 | * | 12/2012 | Rapson | .................. | C08L 83/04 |
| | | | | | | 428/403 |
| 10,087,352 | B2 | * | 10/2018 | Perez | ....................... | C09K 5/14 |
| 2009/0022999 | A1 | * | 1/2009 | Wuu | ....................... | C08K 3/34 |
| | | | | | | 428/447 |
| 2015/0329678 | A1 | * | 11/2015 | Inokuchi | .................... | C08J 7/18 |
| | | | | | | 524/500 |
| 2016/0347937 | A1 | * | 12/2016 | Kim | ....................... | C08K 9/06 |
| 2017/0189305 | A1 | * | 7/2017 | Motornov | ................ | A61Q 1/10 |
| 2018/0057727 | A1 | * | 3/2018 | Perez | ....................... | C09K 5/14 |

FOREIGN PATENT DOCUMENTS

| JP | 11-209618 A | 8/1999 |
|---|---|---|
| JP | 2010-29830 A | 2/2010 |
| JP | 2011-98313 A | 5/2011 |
| JP | 2017-12970 A | 1/2017 |

* cited by examiner

*Primary Examiner* — Margaret G Moore
(74) *Attorney, Agent, or Firm* — Birch, Stewart, Kolasch & Birch, LLP

(57) ABSTRACT

One object of the invention is to improve the affinity between the silicone resin and the thermally conductive filler to facilitate mixing thereof. Another object of the invention is to suppress a viscosity increase of a silicone resin composition containing a high level of loading of thermally conductive filler, and to provide a cured product having a higher thermal conductivity. According to the invention, a thermally conductive silicone composition is provided, which comprises (A) an organopolysiloxane having two or more alkenyl groups each bonded to a silicon atom per molecule; (B) an organohydrogenpolysiloxane having two or more hydrogen atoms each bonded to a silicon atom per molecule in such an amount that the molar ratio of the hydrogen atoms each bonded to a silicon atom in component (B) to the alkenyl groups in component (A) is within the range of from 0.1 to 4; (C) 50 to 98% by mass, based on total weight of the composition, of a thermally conductive filler; and (D) a catalytic amount of a catalyst based on a platinum group metal, wherein the thermally conductive filler has a contact angle with water of at most 75° on the filler surface.

5 Claims, No Drawings

THERMALLY CONDUCTIVE SILICONE COMPOSITION

CROSS REFERENCE

This application claims the benefits of Japanese Patent Application No. 2017-139058 filed on Jul. 18, 2017, the contents of which are hereby incorporated by reference.

FIELD OF THE INVENTION

The present invention relates to a thermally conductive silicone composition containing a thermally conductive filler.

Heat-generating components such as power transistors, CPUs and GPUs are susceptible to performance loss due to heat generation during operation, and are therefore conventionally installed in combination with heat sinks for dissipating heat away from the components. In order to enhance heat dissipation, a thermally conductive sheet, grease or adhesive, which comprises a silicone resin with a thermally conductive filler compounded therein, is interposed between the heat-generating component and the heat sink to bring them into close contact with each other.

With recent miniaturization and high performance trend of semiconductor parts, an amount of heat released from the heat generating components is increased. Thus, further improvement in heat dissipation performance is required. Because a silicone resin by itself has a low thermal conductivity, a thermally conductive filler is widely compounded into the silicone resin so as to attain a higher thermal conductivity in the resulting composition.

However, there is a problem that the addition of the filler significantly increases a viscosity of the resin, which leads to poor workability and restricts the maximum loading amount. This is attributable to poor affinity between the resin and the filler. One known approach to address this problem is to treat the filler surface with a surface treatment agent such as a silane coupling agent, as described in Patent Document 1 listed below.

LIST OF REFERENCES

Patent Document 1: JP-A H11-209618/1999
Patent Document 2: JP-A 2010-29830
Patent Document 3: JP-A 2011-98313
Patent Document 4: JP-A 2017-12970

SUMMARY OF THE INVENTION

In a process of treating the filler surface with a silane coupling agent, however, a problem arises when adsorbed water or organic contaminants are present on the filler surface, because they may inhibits the reaction between a functional group on the filler surface and the silane coupling agent. In a case where the functional group on the filler surface is of low reactivity, the reaction with the silane coupling agent may be incomplete, making it difficult to provide the filler with sufficient affinity with the resin. This is another problem. Thus, there still exist problems in the affinity between the filler and the resin, and there is a need to further improve the affinity.

In view of the above problems, it is an object of the invention to improve the affinity between the silicone resin and the thermally conductive filler and to make mixing of them easier. It is another object of the invention to suppress a viscosity increase of a silicone resin composition containing a high level of loading of a thermally conductive filler, and to provide a cured product having a higher thermal conductivity.

Patent Documents 2 to 4 listed above describe surface modification of a powder material for use as a filler, such as alumina, carbon, aluminum, boron nitride, silicon carbide and aluminum nitride, by bringing the powder material into contact with plasma. The present inventor has found that the affinity between the silicone resin and the thermally conductive filler can be enhanced by making a contact angle of the thermally conductive filler with water to at most 75° by subjecting the filler surface to a plasma treatment as described in Patent Documents 2-4. The inventor has also found that the viscosity increase of the silicone resin composition is made less by the use of the above-mentioned thermally conductive filler even at higher level of loading.

Thus, the present invention provides a thermally conductive silicone composition, comprising:
(A) an organopolysiloxane having two or more alkenyl groups each bonded to a silicon atom per molecule;
(B) an organohydrogenpolysiloxane having two or more hydrogen atoms each bonded to a silicon atom per molecule in such an amount that a molar ratio of the hydrogen atoms each bonded to a silicon atom in component (B) to the alkenyl groups in component (A) is within the range of from 0.1 to 4;
(C) 50 to 98% by mass, based on total weight of the composition, of a thermally conductive filler; and
(D) a catalytic amount of a catalyst based on a platinum group metal,
wherein the thermally conductive filler has a contact angle with water of at most 75° on the filler surface.

In particular, the present invention provides a thermally conductive silicone composition as described above, wherein the thermally conductive filler is plasma treated. More preferably, the present invention provides a thermally conductive silicone composition as described above, wherein the plasma-treated surface of the thermally conductive filler is further treated with (E) a silane coupling agent.

Alternatively, the present invention provides a thermally conductive silicone composition as described above, which comprises, in addition to components (A) to (D) as defined above, (E) a silane coupling agent.

According to the invention, the thermally conductive filler may be inorganic powder which is not treated with a surface treatment agent such as a silane coupling agent or a surfactant.

Effects of the Invention

According to the thermally conductive silicone composition of the invention, by providing a thermally conductive filler having a contact angle with water of at most 75° on the filler surface, the affinity between the silicone resin and the thermally conductive filler can be enhanced, and the viscosity increase of the silicone resin composition is made less even at a higher filler content, resulting in improved workability. It is also possible to provide a silicone resin composition having high thermal conductivity, because the filler content can be increased because of the improved affinity of the silicone resin with the filler.

According to one embodiment of the invention, the contact angle with water of at most 75° on the filler surface is preferably obtained by subjecting the surface of the thermally conductive filler to a plasma treatment. Further, it is preferred that the plasma-treated surface of the thermally conductive filler is further treated with a silane coupling agent (E). Because the thermally conductive filler turns to have cleansed and activated surface after the plasma treatment, it becomes easier for the silane coupling agent to react with the functional group on the plasma treated surface of the thermally conductive filler. Thus, the affinity between the thermally conductive filler and the silicone resin can be further improved, and a silicone resin composition with a decreased level of viscosity can be provided.

DETAILED DESCRIPTION OF THE INVENTION

The present invention will be described below in more detail.

(A) Alkenyl-Containing Organopolysiloxane

Component (A) is an organopolysiloxane having two or more alkenyl groups per molecule, and serves as a base polymer of the composition. Component (A) may be any alkenyl-containing organopolysiloxane known in the art. In general, it is of a linear structure comprising a main chain consisting essentially of diorganosiloxy repeating units, both terminal ends of which are blocked with triorganosiloxy groups, although it may contain a branched structure in a part of the molecule, or the molecule may be cyclic as a whole. In particular, a linear diorganopolysiloxane is preferred in view of physical properties such as mechanical strength of the cured product. While component (A) comprises two or more alkenyl groups per molecule, the alkenyl group may be present solely at the terminal ends of the molecular chain, or, alternatively, at two or more terminal ends of the molecular chain and also on the molecular chain. It is preferred that the alkenyl groups are at least present at two terminal ends of the molecular chain.

Component (A) may be an organopolysiloxane represented by general formula (1) shown below.

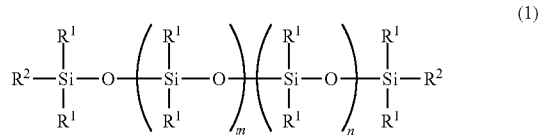

(1)

In the above formula, $R^1$ is, independently at each occurrence, a substituted or unsubstituted monovalent hydrocarbon group which contains no aliphatic unsaturated bond; $R^2$ is, independently at each occurrence, a group represented by $R^1$, an alkenyl group having 2 to 8 carbon atoms, or a cycloalkenyl group having 3 to 8 carbon atoms; $R^3$ is an alkenyl group having 2 to 8 carbon atoms or a cycloalkenyl group having 3 to 8 carbon atoms; and "m" and "n" are, independently of each other, an integer of 0 or more, with the proviso that $10 \leq m+n \leq 10,000$ and $0 \leq n/(m+n) \leq 0.2$.

Preferably, $R^1$ has 1 to 10 carbon atoms, in particular 1 to 6 carbon atoms. Non-limiting examples thereof include alkyl groups, such as methyl, ethyl, propyl, isopropyl, butyl, isobutyl, tert-butyl, pentyl, neopentyl, hexyl, heptyl, octyl, nonyl, decyl and dodecyl groups; cycloalkyl groups, such as cyclopentyl, cyclohexyl and cycloheptyl groups; aryl groups, such as phenyl, tolyl, xylyl, naphthyl and biphenyl groups; aralkyl groups, such as benzyl, phenylethyl, phenylpropyl and methylbenzyl groups; and derivatives thereof in which at least a part of the hydrogen atoms each bonded to a carbon atom are substituted, e.g., with halogen atoms (e.g., fluorine, chlorine, bromine) or a cyano group, including, for example, halogen-substituted alkyl, cyano-substituted alkyl and halogen-substituted aryl groups, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl groups. More preferably, $R^1$ is a substituted or unsubstituted alkyl group having 1 to 3 carbon atoms, such as methyl, ethyl, propyl, chloromethyl, bromoethyl, 3,3,3-trifluoropropyl and cyanoethyl groups; and a substituted or unsubstituted phenyl group, such as phenyl, chlorophenyl and fluorophenyl groups. In particular, methyl is preferred.

Non-limiting examples of $R^3$ include alkenyl groups, such as vinyl, allyl, propenyl, isopropenyl, butenyl and hexenyl groups; and cycloalkenyl groups, such as a cyclohexenyl group. In particular, alkenyl groups having 2 to 3 carbon atoms are preferred, with vinyl and allyl groups being especially preferred. Non-limiting examples of $R^2$ include those groups already mentioned for $R^3$ and $R^1$ above. While the alkenyl group may be present at the terminal or on a side chain, it is preferable that $R^2$ is an alkenyl group.

In general formula (1), "m" is an integer of 0 or more, "n" is an integer of 0 or more, with the proviso that "m" and "n" satisfy $10 \leq m+n \leq 10,000$ and $0 \leq n/(m+n) \leq 0.2$, preferably $50 \leq m+n \leq 2,000$ and $0 \leq n/(m+n) \leq 0.05$.

Component (A) has a viscosity at 23° C. in the range of from 100 to 1,000,000 mPa·s, in particular from 100 to 10,000 mPa·s. If the viscosity is within these ranges, the resulting silicone resin composition is easy to handle. The viscosity herein is measured with a rotational viscometer at 23° C. according to the procedure of the Japanese Industrial Standards (JIS) K 7117-1:1999.

(B) Organohydrogenpolysiloxane

Component (B) is an organohydrogenpolysiloxane and serves as a curing agent. This siloxane contains at least two, preferably at least three, hydrogen atoms each bonded to a silicon atom (i.e., SiH group), which undergo addition reaction with the alkenyl groups in component (A) to form a cured product. The proportion of component (B) is such an amount that the molar ratio of the hydrogen atoms each bonded to a silicon atom in component (B) to the alkenyl groups in component (A) is within the range of from 0.1 to 4, preferably from 0.5 to 3.5, more preferably from 1 to 3. Component (B) may be any organohydrogenpolysiloxane known in the art, and may be any of a linear, cyclic, branched, or three-dimensional network structure.

Component (B) may be an organohydrogenpolysiloxane represented by general formula (2) shown below:

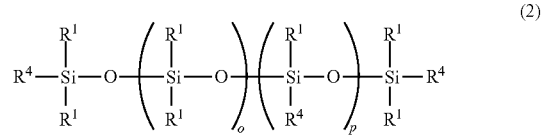

(2)

in which $R^1$ is as already defined above for general formula (1); $R^4$ is a hydrogen atom or a group represented by $R^1$, with the proviso that at least two $R^4$ groups are hydrogen atoms, "o" and "p" are, independently of each other, an integer of 0 or more, with the proviso that $1 \leq o+p \leq 100$.

Non-limiting examples of such organohydrogenpolysiloxanes include siloxane oligomers, such as 1,1,3,3-tetramethyldisiloxane, 1,3,5,7-tetramethyltetracyclosiloxane, and 1,3,5,7,8-pentamethylpentacyclosiloxane; polysiloxanes, such as methylhydrogenpolysiloxane both molecular terminals of which are blocked with trimethylsiloxy groups, dimethylsiloxane-methylhydrogensiloxane copolymer both molecular terminals of which are blocked with trimethylsiloxy groups, methylhydrogenpolysiloxane both molecular terminals of which are blocked with silanol groups, dimethylsiloxane-methylhydrogensiloxane copolymer both molecular terminals of which are blocked with silanol groups, dimethylpolysiloxane both molecular terminals of which are blocked with dimethylhydrogensiloxy groups, methylhydrogenpolysiloxane both molecular terminals of which are blocked with dimethylhydrogensiloxy groups, dimethylsiloxane-methylhydrogensiloxane copolymer both molecular terminals of which are blocked with dimethylhydrogensiloxy groups, dimethylsiloxane-diphenylsiloxane-methylhydrogensiloxane copolymer both molecular terminals of which are blocked with trimethylsiloxy groups, dimethylsiloxane-diphenylsiloxane-methylhydrogensiloxane copolymer both molecular terminals of which are blocked with dimethylhydrogensiloxy groups; and silicone resins comprising $R^1_2(H)SiO_{1/2}$ unit and $SiO_{4/2}$ unit, which may optionally comprise $R^1_3SiO_{1/2}$ unit, $R^1_2SiO_{2/2}$ unit, $R^1(H)SiO_{2/2}$ unit, $HSiO_{3/2}$ unit or $R^1SiO_{3/2}$ unit, wherein $R^1$ is as previously defined above.

The proportion of component (B) is such an amount that the molar ratio of the hydrogen atoms each bonded to a silicon atom in component (B) to the alkenyl groups in component (A) is within the range of from 0.1 to 4, preferably from 0.5 to 3.5, more preferably from 1 to 3. If the proportion of component (B) is less than the lower limit indicated above, the resulting composition may not be cured sufficiently. A proportion of component (B) exceeding the upper limit indicated above is undesirable, as it may cause incomplete cure of the resulting composition and/or gradual dehydrogenation of residual SiH-containing compounds of component (B) over time.

(C) Thermally Conductive Filler

The thermally conductive silicone composition according to the invention may be characterized in that the thermally conductive filler has a contact angle with water of at most 75°, preferably at most 72°, more preferably at most 65°, and most preferably at most 60°, on the filler surface. This feature enhances the affinity of the filler with the silicone resin, leading to a decreased level of viscosity of the composition. The water contact angle as described above may be obtained, for example, by subjecting the surface of the thermally conductive filler to a plasma treatment. The plasma treatment of the filler surface causes removal of organic species on the surface, leaving active hydroxyl groups present in abundance on the treated surface. The hydrophilicity is therefore increased, which in turn results in decreased water contact angle. Also, a thermally conductive filler having a water contact angle as described above can be loaded at a higher level, while suppressing the viscosity increase of the resulting composition. Thus, the amount of filler loaded in the composition can be increased so as to raise the thermal conductivity.

The thermally conductive filler is a component that serves to impart thermal conductivity to the cured resin composition. Preferably, such a thermally conductive filler has a thermal conductivity of at least 0.4 W/m·K, in particular at least 4 W/m·K. Non-limiting examples include ceramic fillers, such as alumina, silica, zinc oxide, boron nitride, aluminum nitride, silicon nitride and silicon carbide powder; and metal powder such as aluminum, copper and nickel powder. Such a filler material may be used alone or in combination. The thermally conductive filler preferably has an average particle size in the range of from 0.1 μm to 50 μm, more preferably from 0.1 μm to 20 μm. The average particle size herein may be determined as a mean cumulative mass $D_{50}$ (or median diameter) in particle size distribution measurement by the laser diffraction method. According to one embodiment of the invention, the thermally conductive filler may be inorganic powder which is not treated with a surface treatment agent such as a silane coupling agent or a surfactant.

Method for Measuring Contact Angle of Powder

As used herein, the contact angle with water on the filler surface is measured according to JIS R 3257:1999 "Testing Method of Wettability of Glass Substrate" on a glass plate to which the filler is uniformly applied. More specifically, a double sided adhesive tape is attached onto a glass plate, and the release liner is removed to expose the adhesive surface. Then, test powder is spread over the adhesive surface. Excess unattached powder is removed by blowing air. These spreading and removing steps are repeated for three times so as to uniformly cover the adhesive tape with test powder attached thereto. The contact angle is measured on the surface thus obtained by a static drop method as described in the JIS standard mentioned above.

According to the invention, the thermally conductive filler is characterized by a contact angle with water of at most 75° on its surface. In general, conventional thermally conductive fillers have a contact angle with water of greater than 75° on their surface. Such conventional thermally conductive fillers can be modified to have a water contact angle of at most 75° by a plasma treatment described in more detail below. If the plasma treatment is insufficient, however, the water contact angle of the filler will stay greater than 75°. Such a filler material has poor affinity with the silicone resin, and the resulting silicone composition loaded with the filler material will show insufficient viscosity drop, with little improvement in the workability.

The thermally conductive filler may be treated with plasma under vacuum or at atmospheric pressure. With regard to a plasma treatment technique, a plasma generator commonly used in the industry may be used. Non-limiting examples thereof include an atmospheric pressure plasma generator in which plasma is generated while introducing an inert gas such as helium or nitrogen, and a vacuum plasma generator in which a gas is introduced under vacuum to generate plasma.

For example, the plasma treatment may be conducted by placing, in a chamber for generating plasma, a thermally conductive filler that is uniformly deposited over the adhesive tape on a glass plate as previously described in the section "Method for Measuring Contact Angle of Powder". Alternatively, a thermally conductive filler may be charged into a chamber for generating plasma, and then the plasma treatment may be conducted in the chamber while uniformly stirring the filler. Suitable conditions for the plasma treatment may be determined by a skilled person.

The atmospheric pressure plasma treatment is advantageous in that it allows inline processing to enhance productivity, and in that the system configuration is simple without the need for a vacuum pump. On the other hand, the vacuum plasma treatment is advantageous in that stable plasma generation is relatively easy and various gases can be introduced.

The amount of component (C) may be from 50 to 98% by mass, preferably from 60 to 95% by mass, more preferably from 75 to 90% by mass, based on total weight of the silicone resin composition. If two or more fillers are used, the total amount of the fillers should be within the above range. It is also preferable that component (C) is present at a volume fraction of 60% or more, provided that the volume of the entire composition is defined as 100%.

(D) Catalyst Based on a Platinum Group Metal

Component (D) is a catalyst based on a platinum group metal, for promoting the addition reaction (hydrosilylation) of alkenyl groups in component (A) with SiH groups in component (B). Any hydrosilylation catalyst known in the art may be used. Non-limiting examples thereof include elemental platinum group metals, such as platinum (including platinum black), rhodium, and palladium; platinum chloride, chloroplatinic acid and salts thereof, such as $H_2PtCl_4\text{-}nH_2O$, $H_2PtCl_6\text{-}nH_2O$, $NaHPtCl_6\text{-}nH_2O$, $KHPtCl_6\text{-}nH_2O$, $Na_2PtCl_6\text{-}nH_2O$, $K_2PtCl_4\text{-}nH_2O$, $PtCl_4\text{-}nH_2O$, $PtCl_2$ and $Na_2HPtCl_4\text{-}nH_2O$ (wherein n is an integer of from 0 to 6, preferably 0 or 6); alcohol-modified chloroplatinic acid (see U.S. Pat. No. 3,220,972); complexes of chloroplatinic acid with olefins (see U.S. Pat. Nos. 3,159,601, 3,159,662 and 3,775,452); platinum group metals, such as platinum black and palladium, supported on carriers, such as alumina, silica and carbon; rhodium-olefin complexes; chlorotris(triphenylphosphine)rhodium (known as Wilkinson catalyst); and complexes of platinum chloride, chloroplatinic acid or salts thereof with vinyl-containing siloxanes, especially vinyl-containing cyclic siloxanes.

Component (D) may be used in a catalytic amount. As used herein, catalytic amount is intended to mean an effective amount for promoting the addition reaction between components (A) and (B) described above. Typically, it ranges from 0.1 to 1,000 ppm by mass, in particular from 0.5 to 500 ppm by mass, of platinum group metal, based on the combined mass of components (A) and (B).

(E) Silane Coupling Agent

Component (E) is a silane coupling agent. By treating the surface of (C) thermally conductive filler of the invention with the silane coupling agent, the affinity of the thermally conductive filler with the silicone resin can be further improved. The surface treatment of the filler with component (E) can further decrease the viscosity of the thermally conductive silicone composition, and facilitate ease of handling. Also, the loading amount of the filler can be increased, so as to provide a silicone resin composition with further improved thermal conductivity.

Non-limiting examples of the silane coupling agent include compounds represented by general formula (3) shown below:

$$R^6Si(OR^7)_3 \qquad (3)$$

wherein $R^6$ is an aliphatic, saturated or unsaturated alkyl group having 1 to 10 carbon atoms, an epoxy group, an acrylic group, or an aromatic hydrocarbon group, and $R^7$ is a methyl or ethyl group; or
compounds represented by general formula (4) shown below:

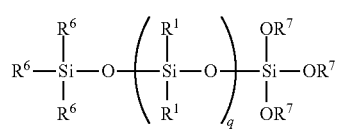

(4)

wherein $R^1$, $R^6$ and $R^7$ are as defined above, and q is an integer of up to 1,000, preferably an integer of from 1 to 100.

The amount of the silane coupling agent may be from 0.1 to 5 parts by mass, based on 100 parts by mass of the filler. When the amount is less than the lower limit shown above, the intended function of the silane coupling agent may not be sufficiently expressed. When the amount exceeds the upper limit shown above, excess silane coupling agent will remain, which may adversely affect the physical properties of the cured product.

With respect to a method of the surface treatment of a thermally conductive filler with a silane coupling agent, it is preferable that the thermally conductive filler (C) after the plasma treatment is surface treated with the silane coupling agent in advance. For the surface treatment, a wet treatment process or a dry treatment process known in the art may be used. More specifically, the surface treatment may be conducted by dissolving or dispersing a compound of formula (3) or (4) shown above in an appropriate solvent, and then admixing inorganic powder to this solution or dispersion, followed by heating/drying. Examples of the solvent include toluene and xylene. The conditions for the heating/drying may be, for example, at a temperature of from 80 to 200° C. for a period of from 0.5 to 10 hours. Alternatively, a base resin mixture comprising a thermally conductive filler treated with a silane coupling agent may be prepared in advance by mixing an alkenyl-containing organopolysiloxane (A), the thermally conductive filler (C), and the silane coupling agent (E). It is also possible to mix components (A) to (D) with component (E) at the same time.

Other Components

The resin composition according to the invention may optionally contain an adhesion aid for imparting adhesiveness. Non-limiting examples of the adhesion aid include linear or cyclic organosiloxane oligomers, organooxysilyl-modified isocyanurate compounds and/or hydrolytic condensates thereof (organosiloxane-modified isocyanurate compounds) of 4 to 50 silicon atoms, preferably 4 to 20 silicon atoms, having at least two, preferably 2 or 3, functional groups per molecule, selected from a hydrogen atom bonded to a silicon atom (SiH group), an alkenyl group bonded to a silicon atom (e.g., Si—CH=CH$_2$ group), an alkoxysilyl group (e.g., trimethoxysilyl group) and an epoxy group (e.g., glycidoxypropyl and 3,4-epoxycyclohexylethyl group). A compound of formula (3) or (4) as described for the silane coupling agent (E) may also be used as an adhesion aid. For example, a thermally conductive filler (C) may be mixed with an alkenyl-containing organopolysiloxane (A) and optionally a silane coupling agent (E) to form a base resin mixture, followed by mixing the base resin mixture with components (B) and (D) and an adhesion aid to form the silicone resin composition. The adhesion aid may be the same compound as the silane coupling agent (E), but because it is added after preparation of the base resin mixture it no longer acts as a surface treatment agent. The amount of adhesion aid is preferably from 0.1 to 5 parts by mass, more preferably from 0.1 to 1 parts by mass, based on 100 parts by mass of component (A). It should be noted that when the adhesion aid has an alkenyl or SiH group, the molar ratio of the SiH groups to the alkenyl groups in the whole composition should be adjusted to lie within the range indicated above.

The thermally conductive silicone composition according to the invention may be prepared by uniformly mixing the components mentioned above. Procedures of conventional methods known in the art may be followed. There is no particular limitation to the curing conditions of the composition. For example, curing may be conducted at a temperature of from 60 to 150° C., preferably from 80 to 150° C., for a period of from 30 seconds to 30 minutes, preferably from 1 to 20 minutes. There is no particular limitation to the thickness of the cured product, although it is undesirable to increase the thickness of the cured product to such an extent that the thermal conductivity is impaired. An especially preferable thickness of the cured product is from 20 to 500 µm, particularly from 30 to 300 µm, more preferably from 30 to 200 µm, in order to ensure desirable thermal conductivity.

The thermally conductive silicone composition according to the invention preferably has a viscosity, as measured at 23° C., of up to 100 Pa·s, more preferably from 10 to 50 Pa·s, although not limited thereto. The viscosity may exceed 100 Pa·s when a high level of the thermally conductive filler is loaded, but still the viscosity increase is suppressed as compared when conventional thermally conductive filler is loaded. The viscosity is measured with a rotational viscometer (Digital Viscometer DV-II+Pro, ex Brookfield) according to the method described in JIS K 7117-1:1999.

The cured product obtained from the thermally conductive silicone composition may have a thermal conductivity of at least 1.5 W/mK, in particular at least 2.0 W/mK, preferably at least 3.0 W/mK. The upper limit of the thermal conductivity is not particularly limited. When the thermal conductivity is less than the lower limit indicated above, sufficient thermal conductivity is unattainable. The thermal conductivity herein may be determined by a non-steady-state method (e.g., laser flash technique; JIS R 1611:2010). In particular, the thermally conductive silicone resin composition according to the invention can provide a cured product having a thermal conductivity as high as 3.0 W/mK or more by loading a high level of the filler.

In one embodiment of the invention, the silicone resin composition may be used for effectively dissipating heat to the outside, for example, by applying it onto a heat-generating part, and then disposing a heat spreader over the applied composition to intimately contact therewith, followed by heating to cure the composition.

EXAMPLES

The present invention is further illustrated by the following Examples and Comparative Examples, which are not to be construed to limit the scope of the invention. The viscosity was measured at 23° C. with a rotational viscometer (Digital Viscometer DV-II+Pro, ex Brookfield) according to the method described in JIS K 7117-1:1999. The thermal conductivity was measured with a thermal conductivity meter (LFA 447, ex NETZSCH) according to the method described in JIS R 1611:2010.

Preparation Example 1

Component (C) was prepared as follows. Alumina powder AO-41R (Admatechs Co. Ltd., average particle size 10 µm) was subjected to a plasma treatment, using PLASMA DRUM (Round Science Co., Ltd.) as a plasma treatment apparatus, at atmospheric pressure, with He of 2 L/min and $N_2$ of 0.2 L/min, at electrical power of 300 W. Alumina powder obtained by the plasma treatment in a duration of 15 minutes is hereinafter called alumina powder 1. Alumina powder obtained by the plasma treatment in a duration of 30 minutes is hereinafter called alumina powder 2. Alumina powder obtained by the plasma treatment in a duration of 60 minutes is hereinafter called alumina powder 3. In Comparative Examples, alumina powder without plasma treatment (alumina powder 4) was used.

The water contact angle of the alumina powder 1 to 4 was measured on a glass plate uniformly coated with each preparation of alumina powder according to JIS R 3257: 1999 "Testing Method of Wettability of Glass Substrate". Details of the measurement procedure are already described above.

Example 1

Preparation of a Base Resin Mixture

A base resin mixture was prepared by mixing 1 kg of polydimethylsiloxane having a viscosity of 1,000 mPa·s, both terminal ends of which are blocked with dimethylvinylsiloxy groups (component (A)), with 5 kg of alumina powder 1 (component (C)) using a planetary mixer.

Preparation of a Silicone Resin Composition

Silicone resin composition 1 was obtained by mixing 600 g of the base resin mixture as obtained above with 2.4 g of methylhydrogenpolysiloxane of the following average formula (3) (component (B)), in a molar ratio of the SiH groups in component (B) to the alkenyl groups in component (A) of 3.0; 0.6 g of a platinum-vinylsiloxane complex (component (D)) with a platinum concentration of 1% by mass); 0.6 g of ethynylcyclohexanol (curing reaction suppressor); and 0.5 g of 2,4,6,8-tetramethyl-2-[3-(oxiranylmethoxy)propyl]-cyclotetrasiloxane (adhesion aid).

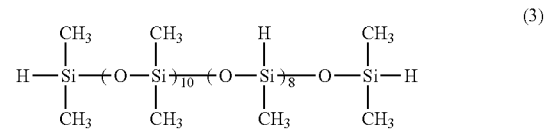

(3)

Examples 2, 3, and Comparative Example 1

In Example 2, the procedures of Example 1 were repeated except that alumina powder 1 was replaced with alumina powder 2 to obtain silicone resin composition 2.

In Example 3, the procedures of Example 1 were repeated except that alumina powder 1 was replaced with alumina powder 3 to obtain silicone resin composition 3.

In Comparative Example 1, the procedures of Example 1 were repeated except that alumina powder 1 was replaced with alumina powder 4 to obtain silicone resin composition 4.

The viscosity was measured for each of silicone resin compositions 1 to 4 respectively obtained in Examples 1 to 3 and Comparative Example 1. The results are as shown in Table 1 below.

TABLE 1

| | Example 1 | Example 2 | Example 3 | Comparative Example 1 |
|---|---|---|---|---|
| Alumina powder | 1 | 2 | 3 | 4 |
| Duration of the plasma treatment (min.) | 15 | 30 | 60 | none |
| Water contact angle of the alumina powder (°) | 75 | 72 | 55 | 85 |
| Viscosity (Pa · s) | 38.3 | 37.5 | 34.4 | 39.2 |

As can be seen from Table 1, the compositions of Examples 1 to 3, each of which comprise alumina powder having a required water contact angle, show the decreased viscosities as compared with the composition comprising the alumina powder having a greater water contact angle.

It can also be seen from Table 1 that the water contact angle of component (C) can be decreased by adjusting the duration of the plasma treatment. The composition of Example 2, which had a water contact angle of 72°, showed a 4% decrease in viscosity as compared with the composition of Comparative Example 1, and the composition of Example 3, which had a water contact angle of 55°, showed a 12% decrease in viscosity as compared with the composition of Comparative Example 1.

Example 4

The procedures of preparing the base resin mixture of Example 1 were repeated except that 10 g of silane coupling agent (E) represented by the formula, $Me_3SiO(Me_2SiO)_{30}Si(OMe)_3$, was further added, to obtain a base resin mixture.

The procedures of preparing the silicone resin composition of Example 1 were repeated except that 600 g of the base resin mixture thus prepared was used to obtain silicone resin composition 5.

Examples 5, 6 and Comparative Example 2

The procedures of Example 4 were repeated except that alumina powder 1 was replaced with alumina powder 2, 3 and 4 to obtain silicone resin compositions 6, 7 and 8, respectively.

The viscosity was measured on each of silicone resin compositions 5 to 8 obtained in Examples 4 to 6 and Comparative Example 2. The results are shown in Table 2 below.

TABLE 2

|  | Example 4 | Example 5 | Example 6 | Comparative Example 2 |
| --- | --- | --- | --- | --- |
| Alumina powder | 1 | 2 | 3 | 4 |
| Duration of the plasma treatment (min.) | 15 | 30 | 60 | none |
| Water contact angle of the alumina powder (°) | 75 | 72 | 55 | 85 |
| Viscosity (Pa · s) | 22.9 | 20.5 | 19.1 | 29.4 |

As can be seen from Table 2, the compositions of Examples 4 to 6, each of which comprises the alumina powder having a required water contact angle, show the decreased viscosities as compared with the composition comprising the alumina powder having a greater water contact angle.

It can also be seen from Table 2 in comparison with Table 1 that the viscosity is further decreased by treating the plasma-treated surface of alumina powder with the silane coupling agent. This indicates that the plasma-treated surface of alumina powder is clean and activated, which makes the surface treatment with the silane coupling agent more efficient.

Example 7

A base resin mixture was prepared by mixing 1 kg of polydimethylsiloxane having a viscosity of 1,000 mPa·s, both terminal ends of which are blocked with dimethylvinylsiloxy groups (component (A)), with 20 kg of alumina powder 3 (component (C)) and 10 g of a silane coupling agent represented by the formula, $Me_3SiO(Me_2SiO)_{30}Si(OMe)_3$, (component (E)), using a planetary mixer.

Silicone resin composition 9 was obtained by mixing 2,100 g of the base resin mixture as obtained above with 2.4 g of methylhydrogenpolysiloxane of average formula (3) shown above (component (B)), in a molar ratio of the SiH groups in component (B) to the alkenyl groups in component (A) of 3.0; 0.6 g of s platinum-vinylsiloxane complex (component (D) with a platinum concentration of 1% by mass); 0.6 g of ethynylcyclohexanol (curing reaction suppressor); and 0.5 g of 2,4,6,8-tetramethyl-2-[3-(oxiranylmethoxy)propyl]-cyclotetrasiloxane (adhesion aid).

Comparative Example 3

A base resin mixture was prepared by mixing 1 kg of polydimethylsiloxane having a viscosity of 1,000 mPa·s, both terminal ends of which are blocked with dimethylvinylsiloxy groups (component (A)), with 20 kg of alumina powder 4 (component (C)) and 10 g of a silane coupling agent represented by the formula, $Me_3SiO(Me_2SiO)_{30}Si(OMe)_3$, (component (E)) using a planetary mixer.

Silicone resin composition 10 was obtained by mixing 2,100 g of the base resin mixture as obtained above with 2.4 g of methylhydrogenpolysiloxane of average formula (3) shown above (component (B)), in a molar ratio of the SiH groups in component (B) to the alkenyl groups in component (A) of 3.0; 0.6 g of a platinum-vinylsiloxane complex (component (D) with a platinum concentration of 1% by mass); 0.6 g of ethynylcyclohexanol (curing reaction suppressor) and 0.5 g of 2,4,6,8-tetramethyl-2-[3-(oxiranylmethoxy)propyl]-cyclotetrasiloxane (adhesion aid).

In an attempt to obtain a cured product in a form of sheet having a thickness of 2 mm by press molding silicone resin composition 10 with a mold heated at 120° C., silicone resin composition 10 was found to be too viscous to conduct viscosity measurement and molding.

Silicone resin composition 9 was press molded with a mold heated at 120° C. to obtain a cured product in a form of sheet having a thickness of 2 mm. The cured product thus obtained was subjected to a heat treatment in an oven at 150° C. for 4 hours, and then its thermal conductivity was measured. The results are shown in Table 3 below.

TABLE 3

|  | Example 7 | Comparative Example 3 |
| --- | --- | --- |
| Alumina powder | 3 | 4 |
| Duration of the plasma treatment (min.) | 60 | none |
| Water contact angle of the alumina powder (°) | 55 | 85 |
| viscosity (Pa · s) | 650 | — |
| thermal conductivity (W/m · K) | 3.5 | — |

As can be seen from Table 3, viscosity increase is less in the thermally conductive silicone composition according to the invention even with a high level of leading of the filler, resulting in a cured products having a thermal conductivity as high as 3.0 W/m·K or more.

According to the present invention, a thermally conductive silicone composition having a lower viscosity with ease of handling is obtained by incorporating a thermally conductive filler having the specific water contact angle. By treating the surface of the thermally conductive filler with a silane coupling agent, the viscosity of the thermally conductive silicone composition can be further decreased. It also becomes possible to load a high level of the thermally conductive filler, so that a cured product with a high thermal conductivity is provided. The thermally conductive silicone resin compositions according to the invention may be suitably used as a heat radiation member disposed between a heat-generating component and a heat sink.

The invention claimed is:

1. A thermally conductive silicone composition comprising:
   (A) an organopolysiloxane having two or more alkenyl groups each bonded to a silicon atom per molecule;
   (B) an organohydrogenpolysiloxane having two or more hydrogen atoms each bonded to a silicon atom per molecule in such an amount that a molar ratio of the hydrogen atoms each bonded to a silicon atom in component (B) to the alkenyl groups in component (A) is within the range of from 0.1 to 4;
   (C) 50 to 98% by mass, based on total weight of the composition, of a thermally conductive filler which is at least one selected from the group consisting of alumina, boron nitride and silicon carbide; and
   (D) a catalytic amount of a catalyst based on a platinum group metal, wherein the thermally conductive filler is not treated with a surface treatment agent and has a contact angle with water of at most 75° on the filler surface.

2. The thermally conductive silicone composition according to claim 1, wherein the surface of component (C) is plasma treated.

3. The thermally conductive silicone composition according to claim 2, wherein the plasma-treated surface of component (C) is further treated with (E) a silane coupling agent.

4. The thermally conductive silicone composition according to claim 1, further comprising (E) a silane coupling agent.

5. The thermally conductive silicone composition according to claim 2, further comprising (E) a silane coupling agent.

* * * * *